April 18, 1950     A. F. HEDBERG     2,504,928
ECCENTRIC COLLET CHUCK

Filed Aug. 7, 1946     4 Sheets-Sheet 1

Inventor:
Albert F. Hedberg
By Joseph O. Lange, Atty.

April 18, 1950     A. F. HEDBERG     2,504,928
ECCENTRIC COLLET CHUCK

Filed Aug. 7, 1946     4 Sheets-Sheet 2

Inventor:
Albert F. Hedberg.
By Joseph O. Lang, Atty.

April 18, 1950     A. F. HEDBERG     2,504,928
ECCENTRIC COLLET CHUCK
Filed Aug. 7, 1946     4 Sheets-Sheet 3
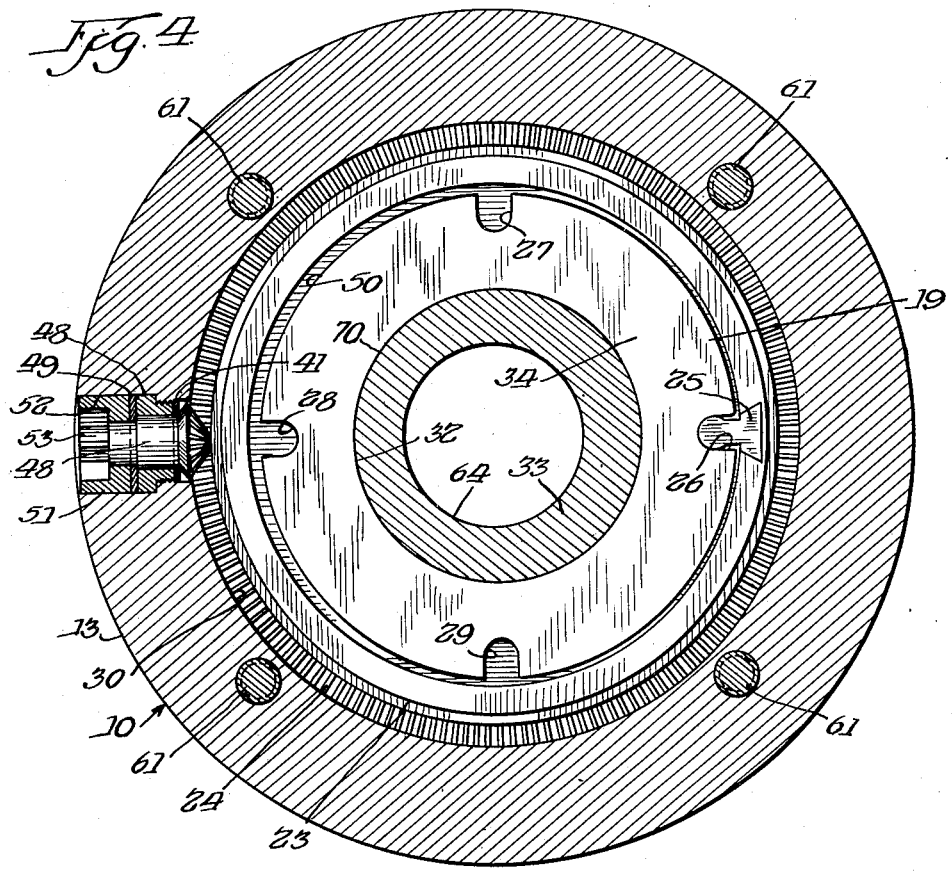
Inventor:
Albert F. Hedberg.
By Joseph O. Lange
Atty.

April 18, 1950     A. F. HEDBERG     2,504,928
ECCENTRIC COLLET CHUCK
Filed Aug. 7, 1946     4 Sheets-Sheet 4
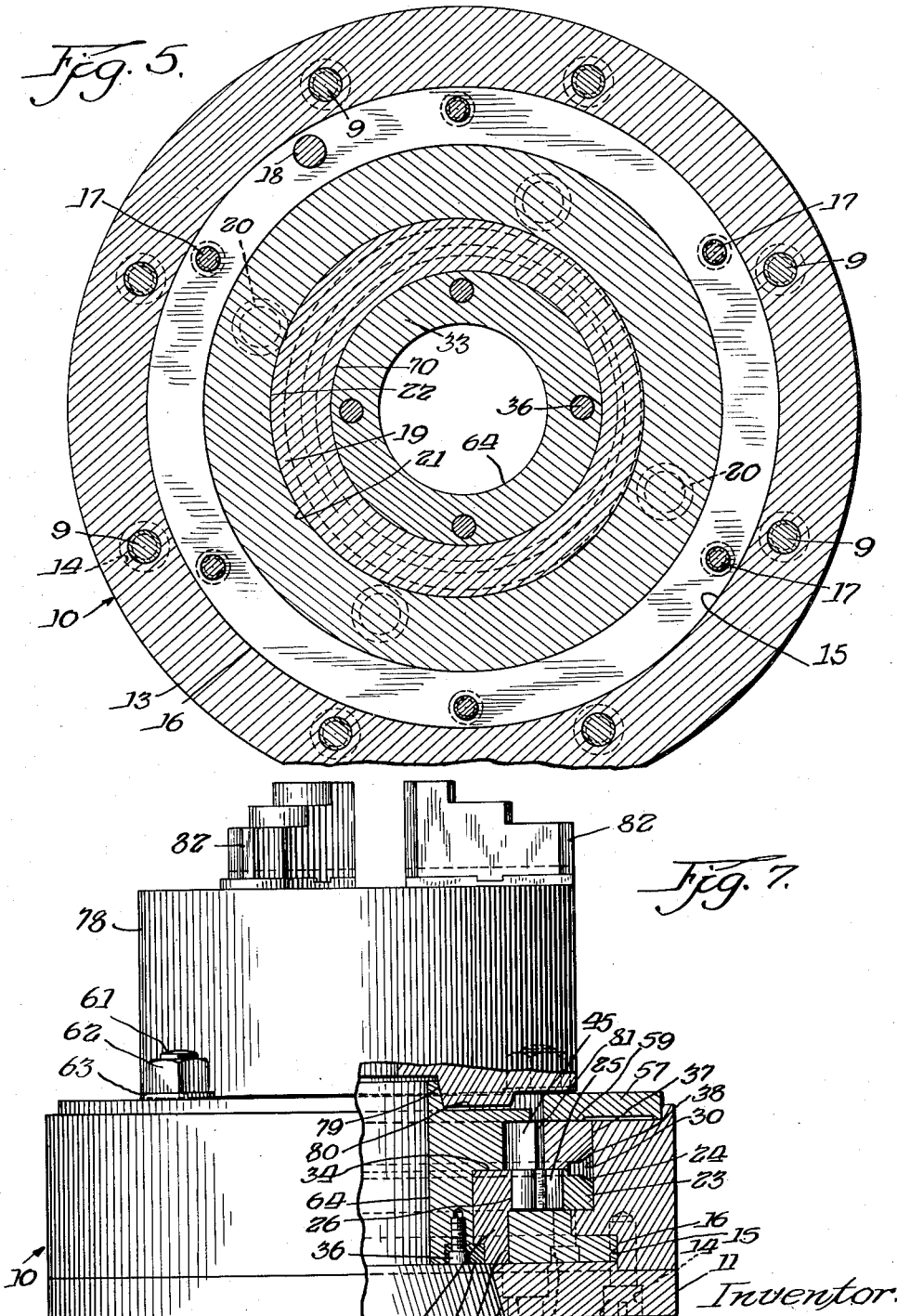

Patented Apr. 18, 1950

2,504,928

UNITED STATES PATENT OFFICE 2,504,928

ECCENTRIC COLLET CHUCK

Albert F. Hedberg, Chicago, Ill., assignor to Crane Co., Chicago, Ill., a corporation of Illinois Application August 7, 1946, Serial No. 688,948

9 Claims. (Cl. 279—6)

1

This invention relates to a chuck and more particularly it is concerned with a novel double eccentric chuck, providing for desirable centering adjustments of the article to be machined after being chucked.

Heretofore it has been a very serious problem to provide conveniently and economically for the necessary chucking when truing the bore or turn of a cylinder, tube or the like. It should of course be understood that when such tubular products are received they are in rough cast form. For their final machining of the bores and also the external diameters they must be accurately concentric in order to insure substantially uniform metal thickness throughout the castings. As they come from the foundry they are frequently out of round so that the metal thickness is not uniform and this may arise from a shift in the cores during the pouring operation or in rapping the pattern. The necessity for conveniently making due adjustability or allowance in machining for such lack of concentricity between the respective inside and outside diameters of the article is the basis for this invention.

It is one of the more important objects to provide a chuck in which the accurate center positioning of the article to be machined is accomplished with a minimum amount of skill on the part of the machine tool operator and which also can be done quickly and accurately in step with up-to-date high speed production methods.

Another important object is to provide a chuck of the character hereinafter described in detail which is relatively cheap to manufacture and which can be assembled with a minimum amount of inconvenience and yet with great accuracy on a lathe or other machine tool.

Other objects and advantages will become more readily apparent upon proceeding with the following specification read in light of the accompanying drawings in which Fig. 1 is a plan view of a preferred form of double eccentric chuck embodying my invention.

Fig. 4 is a transverse sectional view taken on the line 4—4 of Fig. 2.

Fig. 5 is a transverse sectional view taken on the line 5—5 of Fig. 2.

Fig. 6 is a fragmentary sectional view taken on the line 6—6 of Fig. 1.

Fig. 7 is a fragmentary sectional view of a modified form employing a three-jaw universal chuck in place of a collet.

Similar reference characters refer to like parts throughout the several views.

Figure 2:
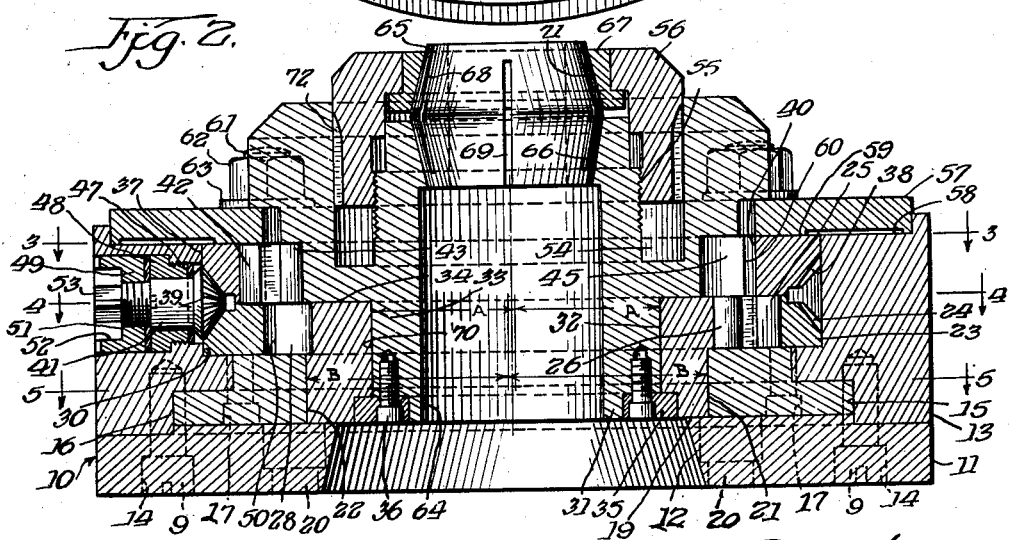
Fig. 2 is a vertical sectional assembly view taken on the line 2—2 of Fig. 1.

Referring now to Fig. 2, the chuck which is generally referred to by the numeral 10 consists of a spindle nose plate 11 having the inside annular tapered portion 12 for positioning upon the conventional spindle nose (not shown) by means of the bolt holes 20. Superposed upon the spindle nose plate 11 is the chuck main body 13 which is held to the spindle nose plate 11 by means of the annularly spaced socket head cap screws 9 receivable within the sockets 14. The main body 13 is preferably relieved as at 15 so as to permit interposing the stationary back eccentric plate 16 between the spindle nose plate 11 and the body 13. As shown more clearly in Fig. 5 the eccentric plate 16 is held to the body 13 by means of the cylindrical head cap screws 17. In addition, in order to locate the back eccentric plate 16 accurately and also so as to provide the desired degree of eccentricity to the rotatable members as hereinafter described, a locating pin 18 is employed which is shown more clearly in Fig. 5. As shown in Fig. 4 the relative eccentricity of the annular member 19 to the surrounding chuck is indicated, being eccentric to the centerline of the chuck on its outer periphery as at 50 and also on its inner bore as at 70 and in diametrically opposed directions to provide for greater relative eccentricity when the member 19 is rotated as hereinafter explained. For journalling and guide purposes, the depending turned eccentric portion 21 of the eccentric annular member 19 is received within the eccentrically bored recess 22 of the back eccentric plate 16, which arrangement with respect to the eccentricity of the relative parts is shown more clearly in the sectional view of Fig. 5 and constitutes the more important elements contributing to the novel performance of this invention.

Resting upon the flat surface of the body 13 within the recess 30 and surrounding the upper portion of the annular eccentric member 19 the lower gear 23 is provided on its outside periphery with the annularly positioned teeth 24. As shown more clearly in Fig. 4 and for the purpose of rotating the annular member 19 the gear 23 is provided with the inwardly projecting lug 25 preferably made of tool steel hardened and preferably finished to engage and be limitly movable depending upon the eccentricity within the recessed portion 26 of the eccentric annular member 19. Only a single means of engagement as described is actually required to effect rotation of the member 19, but it should be noted the additional annularly spaced apart recesses as shown in Fig. 4 at 27, 28 and 29 are preferably provided so that in the event wear takes place between the lug 25 and the initially used recess 26 renewed engagement therebetween can be made by the simple and convenient expedient of repositioning the annular member 19 suitably for subsequent engagement of any one of the remaining recesses by the lug 25 as desired.

As illustrated, rotation of the lower gear 23 is obtained by a suitable pinion gear hereinafter described in more detail in cooperation with a complementary upper gear. Having its lower depending eccentrically positioned portion 31 rotatable and relatively snugly fitted within the similar eccentrically disposed recess 32 of the large eccentric 19 the collet chuck body 33 is preferably positioned so as to shoulder on an upper surface portion 34 of the lower gear 23 and is held substantially axially immovable with relation to the eccentric member 19 by means of the washer 35 and the cap screws 36 for retaining the washer and the collet body 33 in assembled position. For convenience of reference, the eccentrically disposed annular surface or turned portion of the annular collet body 33 is designated with the numeral 70, and the double eccentricity provided by the large eccentric and the collet chuck body is further indicated by the upper and lower arrow limited lines A,A and B,B on each side of the central axis of the clutch body of Fig. 2 in the planes indicated.

Figure 3:
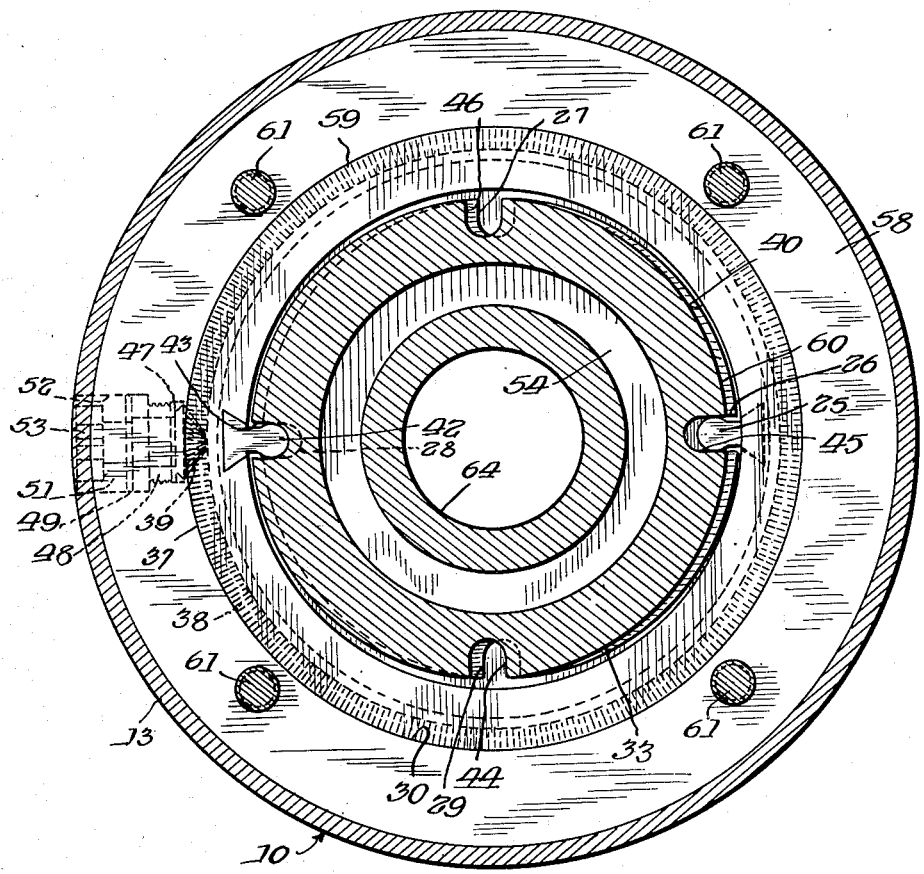
Fig. 3 is a transverse sectional view taken on the line 3—3 of Fig. 2.

Superposed immediately above and bearing directly against the lower gear 23 is the upper or complementary gear 37 retained as at 40 and which, similar to the gear 23, is supplied with the angularly faced teeth 38 peripherally arranged to thereby receive the similarly provided actuating teeth 39 of the pinion gear 41. The upper gear 37, as shown more clearly in Fig. 3, is provided with the hardened machine steel lug 42 engaging the recess 43. As described in connection with the rotatable eccentric member 19 the collet chuck body or annular member 33 as shown in Fig. 3 is supplied with the additional recesses 44, 45, 46 and 47 for the same purpose as described in connection with the recesses of the annular member 19.

As indicated more clearly in Fig. 2, the transversely extending pinion gear 41 is held in position by means of the washer 47, the retainer bushing 48, a second washer 49 and the threaded collar 51. For purposes of rotational actuation the pinion 41 within the recessed portion 52 is supplied with a suitable polygonal head 53 for a wrench, handle or the like. As shown more clearly in Fig. 4 the numeral 50 designates the cam or eccentric surface of the rotatable annular member 19.

Continuing with a description of the rotatable collet chuck body or annular member 33, the upper portion thereof is preferably recessed at 54 and threaded as at 55 to receive the collet chuck nose 56 for purposes of gripping product to be machine turned. The clamping plate 57 bears against the upper surface portion 58 of the chuck body 13 and also against the top surface 59 of the upper gear 37 and is held in place by means of the studs 61 with the nut 62 and the washer 63. The latter assembly holds the collet chuck body in position to bear against the gears and the large eccentric 19 to hold the latter in assembled relation within the main chuck body 13. As shown more clearly in Figs. 1 and 3 the eccentric or cam surface of the collet chuck body is designated by the numeral 60. It should be noted that the collet chuck body is preferably recessed as at 54 below the ring collet member 65, the latter member being supported by the tapered annular shoulder 66 of the collet chuck body 33, while at its upper surface portion it bears against the collar 67 having a complementary tapered annular surface as at 71. The collet in order to allow for suitable flexibility in gripping an article to be machined is fluted alternatively as at 68 and 69.

The conventional structure is followed whereby in order to allow for suitable rotation in tightening the collet chuck, the collar 67 moves upon the threads 55. The manner in which such rotation of the collet 56 is accomplished is not particularly significant although it should be done in such a way that the collet 56 does not have a tendency to back track, loosen or to reverse its rotation when suitably tightened upon the threads 55. It has therefore been found desirable in the latter connection to provide the collet chuck nose 56 with the worm 73 engaging the worm gear 72 formed on the exterior of the collet 56. The worm 73, which is shown more clearly in Fig. 1, has its end portions journalled in the respective supporting lugs 74 and 75, the set screws 76 being used to retain the worm shaft against axial movement. For actuation, at one end portion a square or polygonal end 77 is used to obtain the desired rotation of the worm 73. Thus by the gear means of rotation described the collet 56 is caused to rotate in the usual manner and in so doing provides for the axial movement of the latter member along the surfaces 71 and 66 to contract the collet 65 to grip the article to be machined.

In specifically considering the novel double eccentric feature of this invention, it will of course be apparent that as the pinion gear 41 is rotated, both lower and upper gears 23 and 37 respectively will be caused to rotate simultaneously, but in opposite directions. Thus such rotation of these gears, as shown more clearly in the positions taken in the respective sections of Figs. 3 and 4, causes the eccentric annular members 19 and 33 to be rotated oppositely. The respective eccentricity of surfaces of each of the latter members, within which the collet chuck body 33 is journalled displaces or moves the collet chuck body 33 transversely as desired to bring about the adjustment of the centering required in each case for machining the gripped article. The double eccentric feature will be more clearly apparent in Figs. 3 and 4 in which it will be noted that the respective lugs 42 and 25 effecting the rotation of the respective eccentric annular members move slightly transversely within the recesses 43 and 26 respectively depending upon the eccentricity provided and the rotation of the members 19 and 33 thus permitting the transverse displacement necessary due to the eccentricity referred to of the respective annular members actuated by the respective lower and upper gears 23 and 37. Thus a simple and accurate method has been devised for centering and chucking a member. It will be apparent that the double eccentricity provided permits a relatively large amount of transverse movement in centering the article to be machined without requiring extensive actuation of the gearing or the pinion. The net result is that a chuck has been obtained which permits of quick and convenient adjustment while still preserving a compact structure in which the inner working parts are well protected against dust and objectionable wear arising therefrom.

Figure 1:
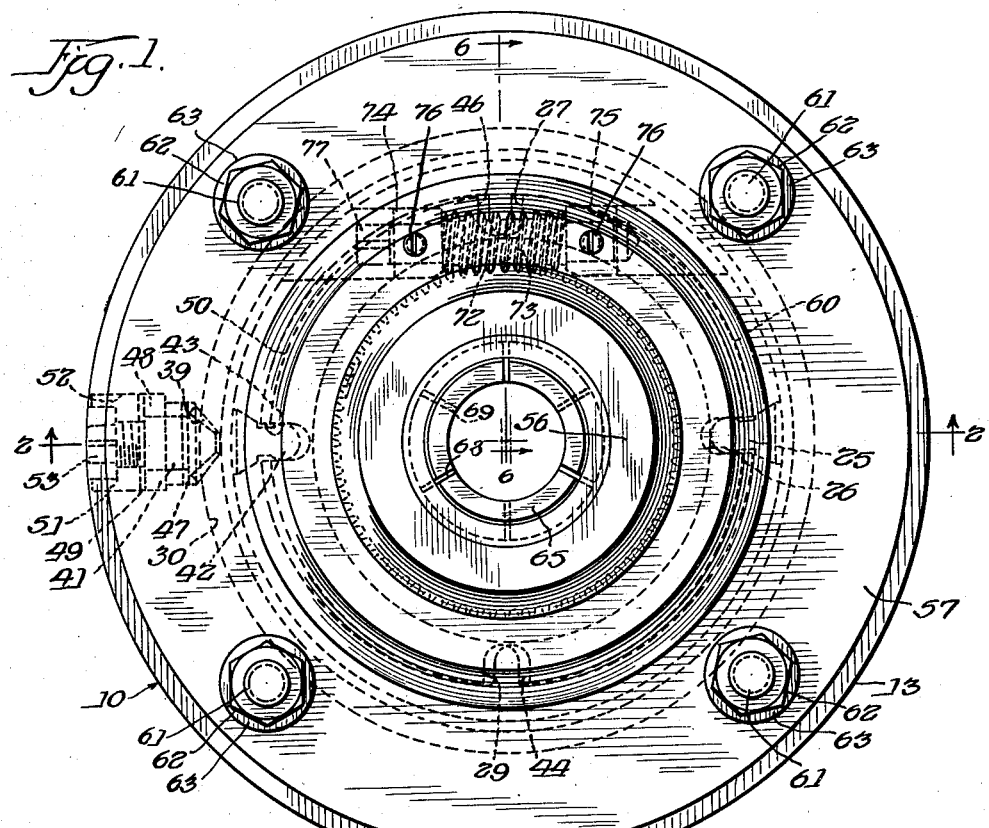

While the chuck in the main embodiment hereinabove described in Figs. 1 to 6 inclusive pertains to a collet type of chuck it is of course true that other conventional gripping means such as a three jaw chuck with a suitable attaching means may also be used. This form of universal chuck is illustrated in the modified construction shown in Fig. 7. All of the internal parts within the main chuck body are similar to those described in connection with the previous figures. However, the clamping plate 57 instead of gripping the upper portion of the collet chuck body as indicated in Fig. 2 provides in the instant modification for attaching a chuck head 78 upon the tapered end 79 of the tongue portion 80 extending within the collet chuck body 81. At the upper portion of the head 78 the three jaw universal chuck 82 is attached by means of the studs 61, nuts 62 and washers 63 which chuck permits internal gripping of such articles to be machined in the usual manner, while at the same time possessing the desirable ease of adjustment afforded by double eccentricity. Of course the collet chuck body 79 in a manner similar to that described in connection with Fig. 2 will function relative to the gears 23 and 37 to give predetermined eccentricity in adjustment while centerpositioning the head 78 for machining gripped product as required. Thus the same desirable degree of centering flexibility described in connection with Fig. 1 is obtained in the modified construction shown in Fig. 7.

It should be evident from the foregoing description of the preferred embodiment and of the modification illustrated that my invention is capable of assuming a wide variety of forms without departure from the true spirit of the inventive concept. It is the desire therefore to be limited only to the extent prescribed by the appended claims interpreted in light of the prior art.

I claim:

1. In a chuck of the character described, a chuck body, a rotatable head within the body, means for attaching the said body to a lathe or the like, telescopically arranged annular members having eccentrically turned portions, the chuck body having an eccentric turned portion surrounded by one of the annular members, means for rotating one of the said telescopically arranged annular members in an opposite direction relative to the said head to thereby shift the said head transversely to the normal central axis of the chuck, means for retaining the said attaching means and said telescopically arranged annular members in assembled relation with the said rotating means.

2. In a double eccentric chuck, the combination including holding means for an article to be chucked, an annular member supporting the said holding means, said annular member having an inner apertured portion eccentrically positioned relative to the central axis of the said holding means, the said latter holding means being received within the eccentrically positioned apertured portion of the said annular member, a second annular member with an apertured portion eccentrically positioned relative to the central axis of the holding means, the said first named annular member being received within the eccentrically positioned apertured portion of the second named annular member, superposed gear means for rotating the said first named annular member and said holding means simultaneously whereby upon actuation of the said gear means the said holding means is displaced transversely relative to the central axis of the chuck by an amount equal to the combined eccentricity of the said first named and second named annular members.

3. In a double eccentric chuck, the combination including holding means for an article to be chucked, an eccentric member annularly supporting the said holding means, said eccentric member having an opening eccentrically positioned relative to the central axis of the said holding means, the said latter holding means being received within the eccentrically positioned opening of the said eccentric member, a body for the said holding means eccentrically positioned relative to the central axis of the holding means, the said eccentric member being received within the eccentrically positioned apertured portion of the body holding means, means for rotating the said eccentric member and said body holding means simultaneously whereby upon actuation of the rotating means the said holding means is displaced transversely to the central axis of the chuck.

4. In double eccentric chucking means, the combination of gripping means including a multiple jaw chuck for an article to be chucked, an annular member having an inner apertured portion eccentrically positioned relative to the central axis of the said gripping means, the said latter gripping means having a lower depending eccentric turned portion received within the eccentrically positioned apertured portion of the said annular member, a second annular member with an apertured portion eccentrically positioned relative to the central axis of the holding means, the said first named annular member being receivable within the eccentrically positioned apertured portion of the second named annular member, means for rotating one of the said first named annular members and said multiple jaw chuck member simultaneously whereby upon actuation of the latter means the said gripping means is transversely movable relative to the central axis of the chuck, the multiple jaw chuck being supported by the said first named annular member and being transversely movable therewith upon actuation of said rotating means.

5. In an eccentric chuck, the combination including holding means for an article to be chucked, an annular member supporting the said holding means, said latter annular member having an apertured turned portion eccentrically positioned relative to the central axis of the said holding means, the said latter holding means cooperating with the eccentrically positioned portion of the said annular member, a second annular member with an apertured portion eccentrically positioned relative to the central axis of the holding means but on the opposite side of the central axis of the first named annular member, the said first named annular member being received within the eccentrically positioned apertured portion of the second named annular member, gear means for rotating the said first named annular member and said holding means simultaneously whereby upon predetermined rotation of the said annular members the said holding means is moved transversely to the central axis of the chuck.

6. In a double eccentric chuck, the combination including holding means for an article to be chucked, an eccentric member annularly supporting the said holding means, said eccentric member having an opening eccentrically positioned relative to the central axis of the said holding means, the said latter holding means being received within the eccentrically positioned opening of the said eccentric member, a body for the said holding means eccentrically positioned relative to the central axis of the holding means, the said eccentric member being received within the eccentrically apertured portion of the body holding means, annularly extending gear means having engageable lugs in different planes for rotating the said eccentric member and said body holding means simultaneously whereby upon actuation of the rotating means the said holding means is displaced transversely to the central axis of the chuck.

7. In a multiple eccentric chuck of the character described, the combination including holding means for an article to be chucked, an eccentric member supporting the said holding means, said eccentric member having an opening eccentrically positioned relative to the central axis of the said holding means, the said latter holding means being received within the eccentrically positioned opening of the said eccentric member, a body for the said holding means eccentrically positioned relative to the central axis of the holding means, the said eccentric member being received within the eccentrically positioned apertured portion of the body holding means, the said eccentric member and body having spaced apart annular recesses, means selectively engaging the latter recesses for rotating the said eccentric member and said body holding means simultaneously, actuation of the rotating means providing for the said holding means being displaced transversely to the central axis of the chuck, the said rotating means providing for clearance between the recesses and the means engaging the recesses whereby the latter engaging means are transversely movable within the recesses upon displacement of the said holding means.

8. In a double eccentric chuck, the combination including holding means for an article to be chucked, an eccentric member cooperating with the said holding means, said eccentric member having an opening eccentrically positioned relative to the central axis of the said holding means, the said latter holding means being received within the eccentrically positioned opening of the said eccentric member, a body for the said holding means eccentrically positioned relative to the central axis of the holding means, the said eccentric member being received within the eccentrically positioned apertured portion of the body holding means, annular means for rotating the said eccentric member and said body holding means simultaneously whereby upon actuation of the said annular means the said holding means is rotated and displaced transversely to the central axis of the chuck, the said holding means including means for tightening the said holding means, the said latter means being movable transversely with the said holding means.

9. In chuck means of the character described, holding means for an article to be gripped, an eccentrically ported and turned member supporting the said holding means, said latter eccentric member being telescopically mounted relative to the said holding means, a body for the said holding means eccentrically positioned relative to the central axis of the holding means, the said eccentrically ported and turned member being journalled over an eccentrically turned portion of the body holding means, annular means for rotating simultaneously the said eccentric member and said body holding means whereby upon actuation of the said annular means the said holding means is rotated while being displaced transversely to the central axis of the chuck, a plurality of plates for maintaining the chuck means in assembled relation.

ALBERT F. HEDBERG.

REFERENCES CITED

The following references are of record in the file of this patent:

UNITED STATES PATENTS

| Number | Name | Date |
|---|---|---|
| 981,566 | Jarvis | Jan. 10, 1911 |
| 984,000 | Hull | Feb. 14, 1911 |
| 1,051,531 | Whipple | Jan. 28, 1913 |

FOREIGN PATENTS

| Number | Country | Date |
|---|---|---|
| 352,190 | France | Aug. 4, 1905 |
| 363,869 | Germany | Dec. 6, 1922 |
| 11,590 | Great Britain | May 11, 1914 |
| 60,084 | Austria | July 10, 1913 |